(12) United States Patent
Kang et al.

(10) Patent No.: US 8,824,575 B2
(45) Date of Patent: Sep. 2, 2014

(54) METHOD AND APPARATUS FOR PROVIDING PILOT SIGNALS IN OFDM FRAMES

(75) Inventors: Jian Feng Kang, Beijing (CN); Shaohua Li, Beijing (CN); Xin Qi, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 427 days.

(21) Appl. No.: 12/994,322

(22) PCT Filed: May 28, 2008

(86) PCT No.: PCT/EP2008/004239
§ 371 (c)(1),
(2), (4) Date: Jan. 10, 2011

(87) PCT Pub. No.: WO2009/143860
PCT Pub. Date: Dec. 3, 2009

(65) Prior Publication Data
US 2011/0096867 A1    Apr. 28, 2011

(51) Int. Cl.
*H04L 27/28* (2006.01)
(52) U.S. Cl.
USPC .......................................................... 375/260
(58) Field of Classification Search
USPC ................. 375/259, 260, 262, 265, 267, 368;
370/208, 210
See application file for complete search history.

(56) References Cited

U.S. PATENT DOCUMENTS

| | | | |
|---|---|---|---|
| 2006/0245349 A1* | 11/2006 | Vrcelj et al. | 370/210 |
| 2007/0217531 A1 | 9/2007 | Kwon et al. | 375/260 |
| 2008/0068980 A1* | 3/2008 | Lim et al. | 370/208 |
| 2010/0142630 A1* | 6/2010 | Kuri et al. | 375/260 |

FOREIGN PATENT DOCUMENTS

| | | |
|---|---|---|
| EP | 1 650 921 A2 | 4/2006 |
| WO | WO 2005/081480 A1 | 9/2005 |

OTHER PUBLICATIONS

Fernàndez-Getino García M J et al: "Pilot patterns for channel estimation in OFDM" Electronics Letters, IEE Stevenage, GB, vol. 36, No. 12, Jun. 8, 2000, pp. 1049-1050, XP006015292 ISSN: 0013-5194.
Fernandez-Getino Garcia M J et al: "Efficient pilot patterns for channel estimation in OFDM systems over HF channels" Vehicular Technology Conference, 1999. VTC 1999—Fall. IEEE VTS 50th Amsterdam, Netherlands Sep. 19-22, 1999, Piscataway, NJ, USA,IEEE, US, vol. 4, Sep. 19, 1999, pp. 2193-2197, XP010353000 ISBN: 978-0-7803-5435-7.
IEEE C802.16m-08/118, Proposed 802.16m Frame Structure Baseline Content suitable for use in the 802.16m SDD, the 802.16m frame structure Rapporteur Group—Mar. 3, 2008, Sassan Ahmadi et al (pp. 1-13).

(Continued)

*Primary Examiner* — Young T. Tse
(74) *Attorney, Agent, or Firm* — Harrington & Smith

(57) ABSTRACT

In a telecommunication network, pilot signals are provided in orthogonal frequency division multiplexing frames to enable a single-carrier frequency division multiple access method to work substantially harmoniously with an orthogonal frequency division multiplexing access method in uplink. Each orthogonal frequency division multiplexing frame comprises a plurality of orthogonal frequency division multiplexing symbols. At least one pilot signal is placed within at least one existing orthogonal frequency division multiplexing symbol.

15 Claims, 6 Drawing Sheets

(56) References Cited

OTHER PUBLICATIONS

IEEE Std 802.16e™-2005 IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1 IEEE Computer Society and the IEEE Microwave Theory and Techniques Society Sponsored by the LAN/MAN Standards Committee IEEE Std 802.16e™-2005 and IEEE Std 802.16™-2004/Cor1-2005 (Amendment and Corrigendum to IEEE Std 802.16-2004) Feb. 28, 2006 (864 pages).

* cited by examiner

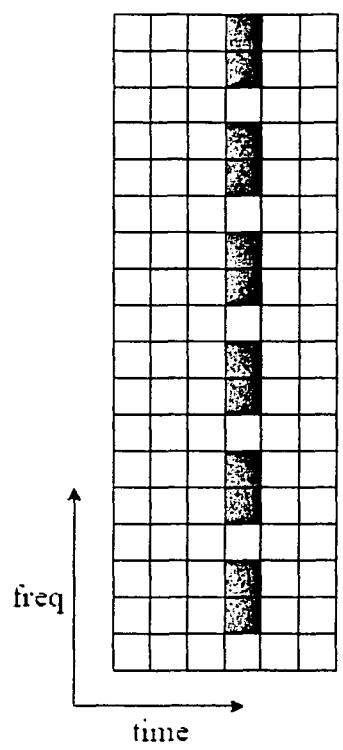 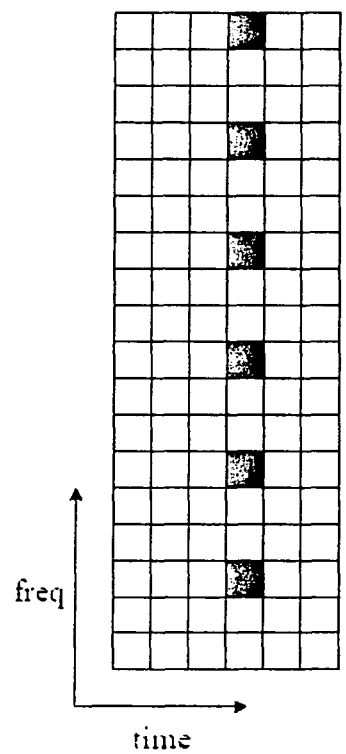
FIGURE 3A
PRIOR ART
FIGURE 3B
PRIOR ART

Cubic metric for QPSK with roll-off factor 0.15

|  | RB = 1 | RB = 2 | RB = 4 | RB = 8 | RB = 16 | RB = 32 |
|---|---|---|---|---|---|---|
| SC-FDMA (as LTE) | 1.0382 | 1.033 | 1.0278 | 1.0206 | 1.0289 | 1.0285 |
| Optional 1 with pilot overhead 1/9 | 2.1255 | 2.0028 | 1.9447 | 1.9362 | 1.9179 | 1.9072 |
| Optional 1 with pilot overhead 1/18 | 2.2598 | 2.2723 | 2.1998 | 2.1869 | 2.1887 | 2.1807 |
| Optional 2 with pilot overhead 1/18 | 1.8367 | 2.0757 | 2.1196 | 2.0882 | 2.0686 | 2.0601 |
| OFDMA | 3.2052 | 3.2714 | 3.3083 | 3.3287 | 3.3658 | 3.3901 |

Cubic metric for 16 QAM with roll-off factor 0.15

|  | RB = 1 | RB = 2 | RB = 4 | RB = 8 | RB = 16 | RB = 32 |
|---|---|---|---|---|---|---|
| SC-FDMA (as LTE) | 1.7932 | 1.7983 | 1.7932 | 1.8089 | 1.8069 | 1.7954 |
| Optional 1 with pilot overhead 1/9 | 2.1719 | 2.1224 | 2.0799 | 2.0597 | 2.0428 | 2.0209 |
| Optional 1 with pilot overhead 1/18 | 2.5297 | 2.5074 | 2.4735 | 2.4772 | 2.4576 | 2.4526 |
| Optional 2 with pilot overhead 1/18 | 2.369 | 2.4406 | 2.4941 | 2.4921 | 2.4622 | 2.4761 |
| OFDMA | 3.2506 | 3.422 | 3.3765 | 3.3799 | 3.373 | 3.3865 |

METHOD AND APPARATUS FOR PROVIDING PILOT SIGNALS IN OFDM FRAMES

FIELD OF THE INVENTION

The present invention relates to a method of providing pilot signals in OFDM (orthogonal frequency division multiplexing) frames, each OFDM frame comprising a predetermined plurality of OFDM symbols, in a telecommunication network, and a computer program configured to perform such a method. Further, the present invention relates to a network element for a telecommunication network, comprising an OFDM generator configured to generate OFDM frames, each OFDM frame comprising a predetermined plurality of OFDM symbols, a pilot generator configured to generate pilot signals, and a transmitter configured to transmit said OFDM frames and said pilot signals, and a communication system comprising at least one network element.

BACKGROUND OF THE INVENTION

Wireless communication systems are widely deployed to provide various types of communication such as voice, packet data, and so on. These systems may be multiple-access systems capable of supporting communication with multiple users sequentially or simultaneously by sharing the available system resources. Examples of such systems include Code Division Multiple Access (CDMA) systems, Time Division Multiple Access (TDMA) systems, and Orthogonal Frequency Division Multiple Access (OFDMA) systems, or any combinations of these.

In wireless communication systems employing orthogonal frequency division multiplexing (OFDM), a transmitter transmits data to a receiver using many subcarriers in parallel. The frequencies of the sub-carriers are orthogonal. Transmitting the data in parallel allows the symbols containing the data to be of longer duration, which reduces the effects of multipath fading. The orthogonality of the frequencies allows the sub-carriers to be tightly spaced, while minimizing inter-carrier interference. At the transmitter, the data is encoded, interleaved, and modulated to form data symbols. Each OFDM symbol is allocated to represent a component of a different orthogonal frequency. An inverse Fast Fourier Transform (IFFT) is applied to the OFDM symbol to generate time samples of a signal. Cyclic extensions, in particular in form of a cyclic prefix (CP), are added to the signal, and the signal is passed through a digital-to-analog converter. Finally, the transmitter transmits the signal to the receiver along a channel When the receiver receives the signal, the inverse operations are performed. The received signal is passed through an analog-to-digital converter, and timing information is then determined. The cyclic extensions are removed from the signal. The receiver performs a fast Fourier transformation (FFT) on the received signal to recover the frequency components of the signal, that is, the data symbols. Error correction may be applied to the data symbols to compensate for variations in phase and amplitude caused during propagation of the signal along the channel. The data symbols are then demodulated, de-interleaved, and decoded, to yield the transmitted data.

The variations in phase and amplitude resulting from propagation along the channel are referred to as the channel response. The channel response is usually frequency and time dependent. If the receiver can determine the channel response, the received signal can be corrected to compensate for the channel degradation. The determination of the channel response is called channel estimation. OFDM systems promise high data rates with low complexity due to the simplicity of the FFT and one-tap propagation channel. However, this can be assured only if the receiver is in a synchronization mode. A drawback of OFDM systems is that they are vulnerable to frequency errors.

An accurate estimate of the response of a wireless channel between a transmitter and a receiver is needed in order to effectively transmit data on the available sub-bands. Channel estimation is typically performed by sending a pilot from the transmitter and measuring the pilot at the receiver. Since the pilot is made up of symbols that are known a priori by the receiver, the channel response can be estimated as the relation of the received pilot symbols over the transmitted pilot symbols. This relation may include any channel dependent information as amplitude, phase, frequency shift, angular spread, interference, noise, etc. The receiver compares the received value of the pilot symbols with the known transmitted value of the pilot symbols to estimate the channel response.

A pilot transmission represents an overhead in a wireless communication system. Thus, it is desirable to minimize pilot transmission to the extent possible. However, because of noise, fading, Doppler, interference, angular dispersion and other artifacts in the wireless channel, a sufficient amount of pilot energy needs to be transmitted frequently enough in order for the receiver to obtain a reasonably accurate estimate of the time-variant channel response. Because the contributions of physical scatters and the propagation paths to the channel response vary over time, the pilot transmission needs to be repeated regularly. The time duration over which the wireless channel may be assumed to be relatively constant is often referred to as a channel coherence time. The repeated pilot transmissions need to be spaced significantly closer in time than the channel coherence time to maintain high system performance. Similarly, for a wideband transmission, the pilot spacing in frequency also has to be sufficiently tight, to be able to estimate the full frequency dependent channel, which possibly extends over the coherence band. The coherence time of a channel may depend, for instance, on the velocity of the receiver. The coherence bandwidth of a channel may depend, for instance, on the delay spread of the channel.

In the downlink of a wireless communication system, a single pilot transmission from an access point (or a network element or a base station or a base station controller) may be used by a number of terminals to estimate the response of the distinct channels from the access point to each of the terminals. Furthermore, the pilot signals of different access points need to be separable form each other, from random data and from noise or interference to allow reliable estimation of the channel between the access point and the terminal. In the uplink, the channel from each of the terminals to the access point typically needs to be estimated through separate pilot transmissions from each of the terminals.

In the current IEEE 802.16m system, OFDMA is used in both uplink and downlink channels as the access technique. However, the single-carrier frequency division multiple access (SC-FDMA) with cyclic prefix (CP) provides additional advantages. It is well known that, compared to OFDMA, one of the main benefits provided by single-carrier transmission is the significantly lower peak-to-average power ratio (PAPR) or cubic metric (CM). The reduction of PAPR or CM channel provides corresponding improvements in power-amplifier efficiency and coverage area. Another problem with OFDMA in mobile environment results from an inevitable frequency offset in the frequency references among different terminals. It has already been demonstrated that using SC-FDMA can overcome this disadvantage, too. Therefore, there is an approach to incorporate the SC-FDMA concept into the IEEE 802.16m system.

SUMMARY OF THE INVENTION

It is an object of the present invention to keep a similar or even lower overhead as that of a legacy system, when the SC-FDMA and IEEE 802.16m concepts are combined with each other.

It is a further object of the present invention to propose a pilot pattern structure which enables the SC-FDMA concept to work with the OFDMA concept in uplink substantially harmonically.

It is a still further object of the present invention to keep the advantage of a lower PAPR when the SC-FDMA concept works with the OFDMA concept.

In order to achieve the above and further objects, in accordance with a first aspect of the present invention, there is provided a method of providing pilot signals in OFDM frames, each OFDM frame comprising a predetermined plurality of OFDM symbols, in a telecommunication network, wherein at least one pilot signal is placed in addition to other data and/or signals within at least one existing OFDM symbol of said predetermined plurality of OFDM symbols.

Further advantageous embodiments and modifications of the method according to the first aspect of the present invention are defined in the dependent claims.

Moreover, preferably each OFDM frame is divided into a predetermined number of sub-frames, and each sub-frame includes a predetermined number of OFDM symbols. The number of sub-frames may be eight, and the number of OFDM symbols may be six.

In accordance with a second aspect of the present invention, there is provided a computer program embodied on a computer readable medium wherein the computer program is configured to perform the method according to the aforementioned first aspect.

In accordance with a third aspect of the present invention, there is provided a network element for a telecommunication network, comprising an OFDM generator configured to generate OFDM frames, each OFDM frame comprising a predetermined plurality of OFDM symbols, a pilot generator configured to generate pilot signals, and a transmitter configured to transmit said OFDM frames and said pilot signals, wherein said pilot generator is configured to place at least one pilot signal within at least one OFDM symbol of said predetermined plurality of OFDM symbols as generated by said OFDM generator, wherein said OFDM generator is configured to place other data and/or signals within the OFDM symbols, and said pilot generator is configured to place the at least one pilot signal in addition to the other data and/or signals within the at least one OFDM symbol.

Further advantageous embodiments and modifications of the network element according to the third aspect of the present invention are defined in the dependent claims.

Moreover, said pilot generator may be configured to place all pilot signals of a pilot pattern within one OFDM symbol.

Said OFDM generator may be configured to generate OFDM frames so that they have a time domain and a frequency domain and said OFDM symbols occur one after another in direction of said time domain, and said pilot generator is configured to place said pilot signals at a predetermined time in said time domain within at least a part of a region or within the whole region of the frequency domain.

Further, said pilot generator may be configured to scatter said pilot signals over the region of the frequency domain.

According to a further preferred embodiment, said pilot generator is configured to distribute said pilot signals essentially evenly over the region of the frequency domain.

According to a still further preferred embodiment, said pilot generator is configured to distribute said plurality of pilot signals essentially evenly over the region of the time domain. Said pilot generator may be configured to incorporate only one pilot signal or a block of frequency continuous pilot signals into each OFDM symbol. Further, said pilot generator may be configured to scatter said plurality of pilot signals over both the whole region of the time domain and the whole region of the frequency domain.

According to a still further preferred embodiment, said pilot generator is configured to scatter all pilot signals of a pattern over both the region of the time domain and the region of the frequency domain.

According to a still further preferred embodiment, said transmitter is configured to use the at least one pilot signal in an uplink channel of an IEEE 802.16m system when SC-FDMA and OFDMA systems are employed simultaneously.

Preferably, said OFDM generator is configured to generate OFDM frames so that each OFDM frame is divided into a predetermined number of sub-frames, and each sub-frame includes a predetermined number of OFDM symbols, wherein the number of sub-frames may be eight, and the number of OFDM symbols may be six.

Further, the network element may comprise a receiver configured to use said pilot signals for channel synchronization and/or channel estimation.

Preferably, said pilot generator is configured to perform the placement of the at least one pilot signal within the at least one OFDM symbol in an adaptive manner so as to reduce overhead.

In terms of the present invention, the network element is defined as being e.g. an access point, a base station, a base station controller or a user equipment.

In accordance with a fourth aspect of the present invention, there is provided a communication system comprising at least one network element according to the aforementioned third aspect.

For SC-FDMA, in order to keep the PAPR low, the best way would be to put the pilot and the data in different OFDM symbols, as is the case with the uplink design of the 3GPP LTE (third generation partnership project long term evaluation) system. If pilot and data are multiplexed into one OFDM symbol, obviously, the PAPR will increase significantly without any elegant design. However, according to the frame structure and pilot overhead requirements of the IEEE 802.16m standard, it is impossible to let pilots occupy one whole OFDM symbol. E.g., if an OFDM frame is divided into a predetermined number of sub-frames, each sub-frame includes 6 symbols, and one whole OFDM symbol is used to accommodate pilots only, the overhead will be 1/6, whereas the overhead for an adaptive modulation and coding (AMC) mode in a legacy system is 1/9. It is assumed that the overhead of the IEEE 802.16m system is required to be lower than that of the 802.16e system. So, one whole OFDM symbol cannot be used as the pilots for SC-FDMA in the IEEE 802.16m system.

In order to keep the same or lower overhead as that of the legacy system, according to the present invention pilot carrier and data carrier are put together into one OFDM symbol. Further, in order to still keep the advantage of a lower PAPR, new pilot pattern and new pilot sequence are proposed by this invention. In particular, in order to accommodate with the IEEE 802.16m frame structure and to keep the same pilot overhead as in the legacy system, the present invention proposes pilot patterns to enable the SC-FDMA concept to work with OFDMA in uplink harmonically.

According to exemplary embodiments, two exemplary kinds of pilot patterns are proposed. A first exemplary pilot pattern may be provided by inserting all the pilots into the same OFDMA symbol. A second exemplary pilot pattern may be provided by scattering the pilots across the time-frequency region, in particular across the whole time-frequency region.

With the pilot patterns as proposed by the present invention data can be multiplexed with the pilot in one OFDM symbol, wherein even the PAPR can be reduced and therefore kept lower than in the prior art.

BRIEF DESCRIPTION OF THE DRAWINGS

Further embodiments, details, advantages and modifications of the present invention will become apparent from the following detailed description of the preferred embodiments which is to be taken in conjunction with the accompanying drawings, in which:

FIG. 3A schematically shows a pilot pattern according to a first exemplary embodiment in a first modification, and FIG. 3B schematically shows a pilot pattern according to a first exemplary embodiment in a second modification;

DESCRIPTION OF THE PREFERRED
EMBODIMENT

Figure 1:
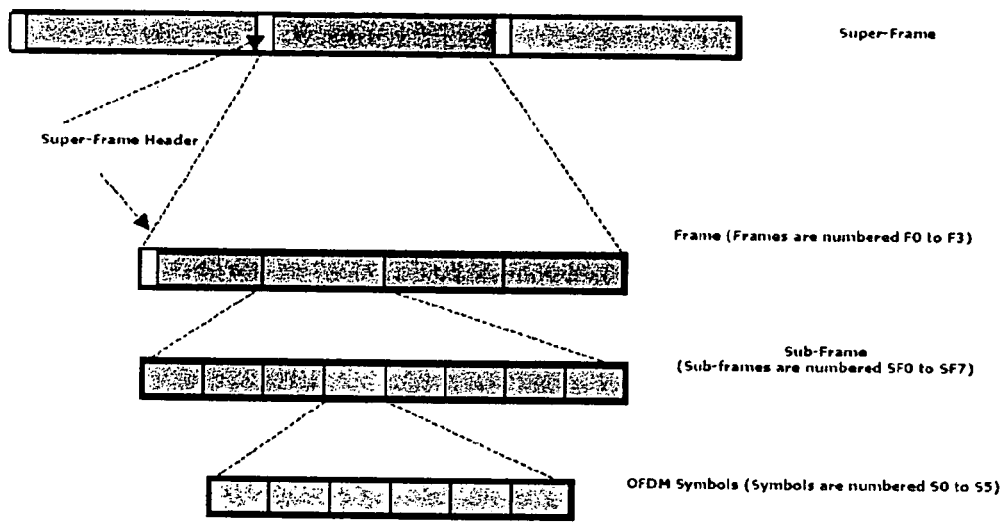
FIG. 1 schematically shows a basic frame structure according to the IEEE 802.16m system description document.

The IEEE 802.16m basic frame structure is assumed to be as schematically illustrated in FIG. 1. Each 20 ms superframe is divided into four equally-sized 5 ms radio frames. When using the same OFDMA numerology as in the 802.16e system, each 5 ms radio frame further consists of eight sub-frames. Each sub-frame can be assigned for either downlink or uplink transmission depending on the duplexing scheme. There are two types of sub-frames: 1) the regular sub-frames which consist of six OFDMA symbols and 2) the irregular sub-frames that consist of five or less OFDMA symbols. The basic frame structure is applied to e.g. frequency division duplex (FDD), time division duplex (TDD), and half frequency division duplex (H-FDD) schemes. In each subframe, physical resource blocks (PRBs) are defined as the minimum resource allocation unit. One PRB is defined as e.g. consisting of N continuous carriers x M continuous OFDM symbols (i.e., N=18, M=6 for a regular sub-frame and N=18, M=5 for a non-regular sub-frame in current 802.16m system).

For SC-FDMA, in order to keep the PAPR low, the best way would be to put the pilot and the data in different OFDM symbols, as is the case with the uplink design of the 3GPP LTE system. If pilot and data are multiplexed into one OFDM symbol, obviously, the PAPR will increase significantly without any elegant design. However, according to the frame structure and pilot overhead requirements of the IEEE 802.16m standard, it is impossible to let pilots occupy one whole OFDM symbol. Specifically, as mentioned before with reference to FIG. 1, in the IEEE 802.16m basic frame structure one OFDM frame is divided into eight sub-frames, and one sub-frame includes six symbols. If one whole OFDM symbol is used as pilots, i.e. to accommodate pilots only, as shown by example in FIG. 2, the overhead will be 1/6, whereas the overhead for an adaptive modulation and coding (AMC) mode in a legacy system is 1/9. It is assumed that the overhead of the IEEE 802.16m system is required to be lower than that of the 802.16e system. So, one whole OFDM symbol cannot be used as the pilots for SC-FDMA in the IEEE 802.16m system.

In order to keep the same or lower overhead as that of the legacy system, according to the present invention pilot carrier and data carrier are put together into one OFDM symbol. Further, in order to still keep the advantage of a lower PAPR, new pilot pattern and new pilot sequence are proposed herein after with reference to exemplary embodiments. Moreover, in order to accommodate with the IEEE 802.16m frame structure and to keep the same or less pilot overhead than in the legacy system, pilot patterns are proposed to enable the SC-FDMA concept to work with OFDMA in uplink harmonically.

Figure 4:
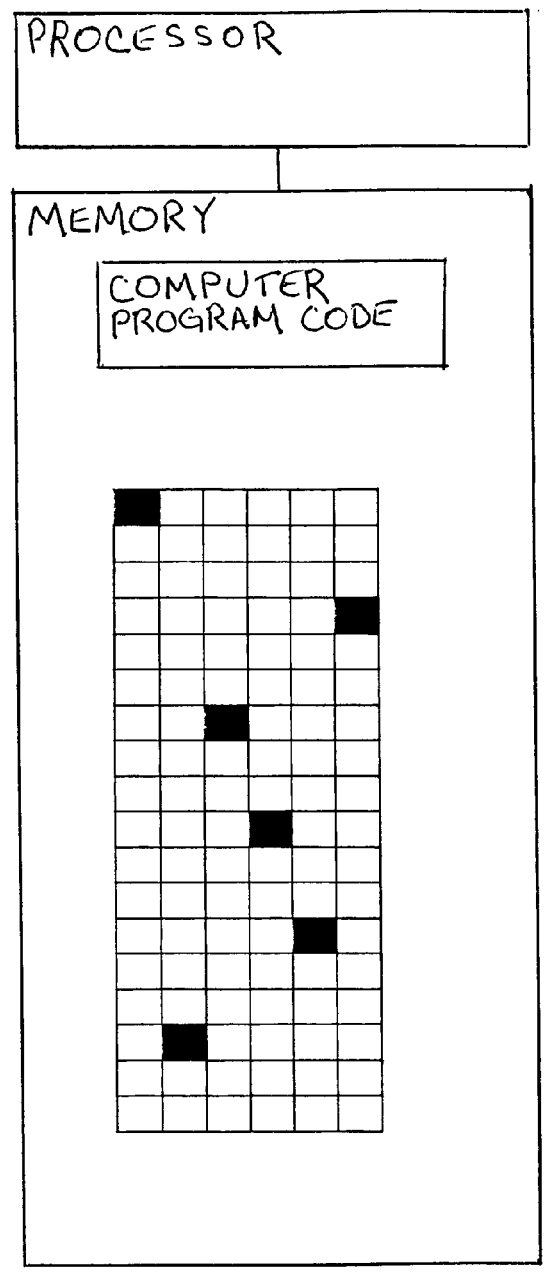
FIG. 4 schematically shows a pilot pattern according to a second exemplary embodiment.

In the following, two kinds of pilot patterns are described as exemplary embodiments. FIG. 3A illustrates a first pilot pattern wherein all pilots are inserted in the same OFDM symbol. FIG. 3B illustrates a second pilot pattern wherein the pilots are scattered across the whole time-frequency region, which is shown in greater detail in FIG. 4. When the pilot overhead is relatively high, e.g. 1/9, the pilot pattern in FIG. 3A is suggested to be used. Otherwise, when the pilot overhead is relatively low, e.g. 1/18, pilot patterns shown in FIG. 3B and FIG. 4 are recommended.

In the first pilot pattern as shown in FIG. 3A, under the assumption that the number of subcarriers is N and the amount of the pilot overhead is $$P/Q \times \frac{1}{6}$$

(P is relatively prime to Q), a number of Qm+p (p=0,1, ... P−1) (m=0,1, ..., (N/Q−1)) subcarriers in the $4^{th}$ OFDM symbol are allocated for pilots, and other subcarriers are for data. The symbols in the (Qm+p)th subcarrier is $s_u(mP+p)$, which is a Zadoff-Chu sequence and given by $$s_u(k=mP+p) = \begin{cases} \exp\left\{-j2\pi\mu\frac{k(k+1)+qk}{2N_G}\right\}, & \text{for odd } N_G \\ \exp\left\{-j2\pi\mu\frac{k^2+qk}{2N_G}\right\}, & \text{for even } N_G \end{cases}$$

where $N_G$ is an integer number being k=0, ..., $N_G$−1, q is an any integer, and µ=1, ..., $N_G$−1. For simplicity, it can be chosen $$q=0, \mu=1, N_G = N \times \frac{P}{Q}.$$

In the pilot pattern shown in FIG. 4, the pilot symbol can be chosen according to traditional OFDMA pilot design criteria.

With these pilot patterns, data can be multiplexed with the pilot in one OFDM symbol, but the PAPR can still be kept relatively low.

Figure 2:
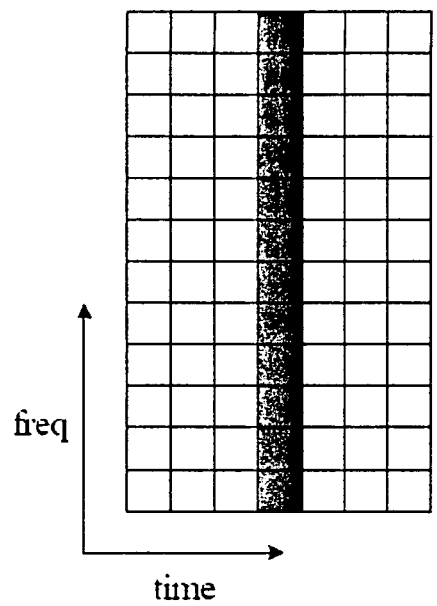
FIG. 2 schematically shows a pilot pattern proposed in the prior art for the LTE system.

For a comparative simulation, each resource block (RB) is assumed to include 18 subcarriers and 6 OFDM symbols (18×6), and 1024 subcarriers are assumed to be included in each OFDM symbol. For SC-FDMA, all the pilots are inserted in one OFDM symbol, as shown in FIG. 2. For OFDMA, pilots are inserted by an AMC mode according to the IEEE 802.16e standard. Since the number of RBs used in the uplink channel will impact on the CM performance, the CM performance is given with different RB numbers, i.e., RB number is 1, 2, 4, 8, 16 and 32.

Figure 5:
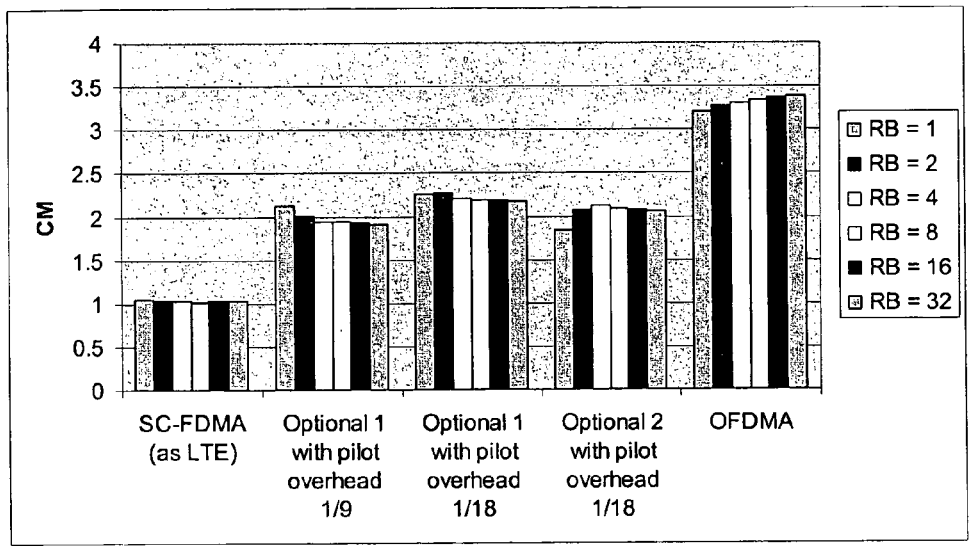
FIG. 5 is a schematical diagram showing the value of cubit metric for QPSK with the roll-off factor being 0.15 in accordance with different scenarios.
Figure 6:
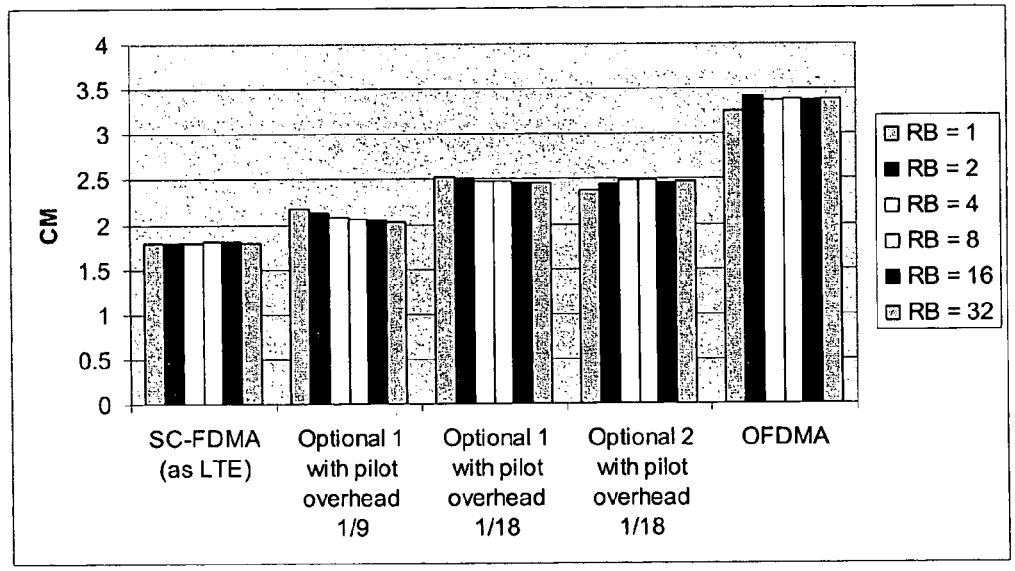
FIG. 6 is a schematical diagram showing the value of cubit metric for 16 QAM with the roll-off factor being 0.15 in accordance with different scenarios.

When the overhead is 1/9, with the first pilot pattern as shown in FIG. 3A, the CM gain is at least 1.1 dB over OFDMA. When the overhead is 1/18, with the second pilot pattern as shown in FIG. 4, the CM gain is about 1.2 dB for a quadrature phase shift keying (QPSK) case. For a 16 quadrature adaptive modulation (QAM) case, about 0.8 dB gain is still kept. The QPSK case is shown in FIG. 5, and the QAM case is show in FIG. 6.

It is to be understood that in the embodiment of the present invention, the operations are performed in the sequence and manner as shown although the order of some operations and the like may be changed without departing from the spirit and scope of the present invention.

The steps of the methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

According to a set of exemplary embodiments of the invention, each orthogonal frequency division multiplexing frame has a time domain and a frequency domain. The orthogonal frequency division multiplexing symbols occur one after another in direction of the time domain, and the pilot signals are placed at a predetermined time in the time domain within at least a part of a region in direction of the frequency domain. According to a set of further illustrative embodiments, the pilot signals may be placed within the whole region of the frequency domain, such that the pilot signals may be scattered over the region of the frequency domain. A computer program embodied on a computer readable medium may be configured to perform any of the foregoing methods According to another set of exemplary embodiments of the invention, each orthogonal frequency division multiplexing frame has a time domain and a frequency domain. A predetermined plurality of pilot signals are scattered over both at least a part of a region of the time domain as well as at least a part of a region of the frequency domain. Each orthogonal frequency division multiplexing symbol in one resource block may include only one pilot signal or a block of frequency continuous pilot signals. The at least one pilot signal is used in an uplink channel when only single-carrier frequency division multiple access (SC-FMDA) is employed, or when SC-FDMA and orthogonal frequency division multiplexing access (OFDM access) systems are employed simultaneously. The pilot signals may be used for channel synchronization and/or channel estimation. The placement of the at least one pilot signal within the at least one orthogonal frequency division multiplexing symbol may be carried out in an adaptive manner so as to reduce overhead. A computer program embodied on a computer readable medium may be configured to perform any of the foregoing methods.

According to another set of illustrative embodiments, a network element for a telecommunication network includes an orthogonal frequency division multiplexing generator configured to generate orthogonal frequency division multiplexing frames, each orthogonal frequency division multiplexing frame comprising a predetermined plurality of orthogonal frequency division multiplexing symbols, a pilot generator configured to generate pilot signals, and a transmitter configured to transmit the orthogonal frequency division multiplexing frames and the pilot signals. The pilot generator is configured to place at least one pilot signal within at least one orthogonal frequency division multiplexing symbol of the predetermined plurality of orthogonal frequency division multiplexing symbols as generated by the orthogonal frequency division multiplexing generator. The orthogonal frequency division multiplexing generator is configured to place other data and/or signals within the orthogonal frequency division multiplexing symbols, and the pilot generator is configured to place the at least one pilot signal in addition to the other data and/or signals within the at least one orthogonal frequency division multiplexing symbol.

The pilot generator may comprise a multiplexer configured to multiplex the at least one pilot signal with the data within the at least one orthogonal frequency division multiplexing symbol. The pilot generator may comprise an interleaver configured to interleave the at least one pilot signal with the data, wherein the interleaver is configured to essentially periodically interleave the at least one pilot signal with the data, wherein the interleaver is configured to interleave the at least one pilot signal with the data in one resource block including a plurality of orthogonal frequency division multiplexing symbols, and wherein the orthogonal frequency division multiplexing generator is configured to insert at least one data carrier carrying data in the at least one orthogonal frequency division multiplexing symbol. The pilot generator may be configured to insert at least one pilot carrier carrying the at least one pilot signal in the at least one orthogonal frequency division multiplexing symbol.

The pilot generator may be configured to generate a pilot pattern including a predetermined plurality of pilot signals. The pilot generator may comprise a sequencer configured to define a predetermined plurality of pilot signals as a pilot sequence, wherein the sequencer is configured to define the pilot sequence as a Zadoff-Chu sequence. The orthogonal frequency division multiplexing generator may be configured to generate orthogonal frequency division multiplexing frames so that they have a time domain and a frequency domain, and the pilot generator may be configured to scatter a predetermined plurality of pilot signals over both at least a part of a region of the time domain as well as at least a part of a region of the frequency domain. The network element may be an access point, a base station, a base station controller or a user equipment.

With respect to the present invention, network devices may be any device that utilizes network data, and can include switches, routers, bridges, gateways or servers. In addition, while the terms frame and signals have been used in the description of the present invention, the invention has import to many types of network data. For purposes of this invention, the term data includes packet, cell, frame, datagram, bridge protocol data unit packet, packet data and any equivalents thereof.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

The invention claimed is:

1. A method comprising:
providing a plurality of pilot signals in orthogonal frequency division multiplexing frames, each orthogonal frequency division multiplexing frame comprising a plurality of orthogonal frequency division multiplexing symbols;
wherein providing comprises placing the plurality of pilot signals within at least one existing orthogonal frequency division multiplexing symbol of said plurality of orthogonal frequency division multiplexing symbols;
multiplexing the plurality of pilot signals with first data within the at least one orthogonal frequency division multiplexing symbol;
periodically interleaving the plurality of pilot signals with the first data, such that the plurality of pilot signals are interleaved with the first data in one resource block including the plurality of orthogonal frequency division multiplexing symbols; and
placing the plurality of pilot signals within one orthogonal frequency division multiplexing symbol of the plurality of orthogonal frequency division multiplexing symbols, each orthogonal frequency division multiplexing frame having a time domain and a frequency domain, wherein said plurality of orthogonal frequency division multiplexing symbols occur one after another in direction of said time domain, and said plurality of pilot signals are placed at a time in said time domain within at least a part of a region in direction of the frequency domain.

2. The method according to claim 1, further comprising inserting at least one data carrier carrying second data and at least one pilot carrier carrying the plurality of pilot signals in the plurality of orthogonal frequency division multiplexing symbols.

3. The method according to claim 1, further comprising using the plurality of pilot signals to define a pilot pattern.

4. The method according to claim 1, further comprising using the plurality of pilot signals to define a pilot sequence, and wherein said pilot sequence is a Zadoff-Chu sequence.

5. The method according to claim 1, further comprising placing said plurality of pilot signals within the whole region of the frequency domain, wherein said plurality of pilot signals are scattered over the region of the frequency domain.

6. The method according to claim 1, further comprising scattering the plurality of pilot signals over both at least a part of a region of the time domain and at least a part of a region of the frequency domain.

7. The method according to claim 6, wherein each orthogonal frequency division multiplexing symbol of the plurality of orthogonal frequency division multiplexing symbols is in one resource block that includes only one pilot signal or a block of frequency continuous pilot signals.

8. The method according to claim 1, further comprising using the plurality of pilot signals in an uplink channel when only SC-FDMA (single-carrier frequency division multiple access) are employed or SC-FDMA and OFDMA (OFDM access) systems are employed simultaneously.

9. The method according to claim 1, further comprising using said plurality of pilot signals for channel synchronization, or for channel estimation, or for both channel synchronization and channel estimation.

10. The method according to claim 1, further comprising carrying out the placement of the at least one pilot signal of the plurality of pilot signals within the at least one orthogonal frequency division multiplexing symbol in an adaptive manner so as to reduce overhead.

11. A computer program product, implemented in a non-transitory computer-readable storage medium and including a computer program code that, when executed by a processor, is configured to cause the processor to perform the method according to claim 1.

12. An apparatus comprising one or more processors and one or more memories including computer program code, the one or more memories and the computer program code being configured, with the one or more processors, to cause the apparatus to perform at least the following:
the one or more processors controlling generation of orthogonal frequency division multiplexing frames, each orthogonal frequency division multiplexing frame comprising a plurality of orthogonal frequency division multiplexing symbols;
the one or more processors controlling generation of a plurality of pilot signals;
the one or more processors controlling transmission of said orthogonal frequency division multiplexing frames and said plurality of pilot signals;
the one or more processors controlling a placement of the plurality of pilot signals within at least one orthogonal frequency division multiplexing symbol of said plurality of orthogonal frequency division multiplexing symbols;
the one or more processors controlling a placement of data within the plurality of orthogonal frequency division multiplexing symbols;
the one or more processors controlling a multiplexing of the plurality of pilot signals with the data within the at least one orthogonal frequency division multiplexing symbol of the plurality of orthogonal frequency division multiplexing symbols;
the one or more processors controlling a periodic interleaving of the plurality of pilot signals with the data, such that the plurality of pilot signals are interleaved with the data in one resource block including the plurality of orthogonal frequency division multiplexing symbols;
the one or more processors controlling an insertion of at least one data carrier carrying the data in the at least one orthogonal frequency division multiplexing symbol; and
the one or more processors controlling an insertion of at least one pilot carrier carrying the plurality of pilot signals in the plurality of orthogonal frequency division multiplexing symbols.

13. The apparatus according to claim 12, wherein the one or more processors further controls generation of a pilot pattern including the plurality of pilot signals.

14. The apparatus according to claim 12, wherein the one or more processors further control defining the plurality of pilot signals as a pilot sequence, and said pilot sequence being a Zadoff-Chu sequence.

15. The apparatus according to claim 12, wherein the one or more processors further control generation of the orthogonal frequency division multiplexing frames so that they have a time domain and a frequency domain, and scatter the plurality of pilot signals over both at least a part of a region of the time domain and at least a part of a region of the frequency domain.

\* \* \* \* \*